(12) United States Patent
Ouderkirk et al.

(10) Patent No.: US 12,092,844 B2
(45) Date of Patent: Sep. 17, 2024

(54) LIQUID LENS WITH GRAVITY SAG CORRECTION

(71) Applicant: Meta Platforms Technologies, LLC, Menlo Park, CA (US)

(72) Inventors: Andrew John Ouderkirk, Redmond, WA (US); Nagi Hosni Elabbasi, Southborough, MA (US); Spencer Allan Wells, Seattle, WA (US); Christopher Stipe, Woodinvill, WA (US); Kenneth Alexander Diest, Kirkland, WA (US); Christopher Yuan Ting Liao, Seattle, WA (US); Liliana Ruiz Diaz, Redmond, WA (US); Laura Cressman, Carnation, WA (US); Taha Masood, Sammamish, WA (US); James Howard Thomas Ransley, Medford, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 640 days.

(21) Appl. No.: 17/193,921

(22) Filed: Mar. 5, 2021

(65) Prior Publication Data
US 2022/0283340 A1    Sep. 8, 2022

(51) Int. Cl.
*G02B 3/14*    (2006.01)
(52) U.S. Cl.
CPC ..................................... *G02B 3/14* (2013.01)
(58) Field of Classification Search
CPC ....................................................... G02B 3/14
See application file for complete search history.

(56) References Cited

U.S. PATENT DOCUMENTS

| 10,677,966 B1 | 6/2020 | Ouderkirk et al. |
| 2011/0032624 A1 | 2/2011 | Bolis et al. |
| 2020/0309995 A1 | 10/2020 | Wells et al. |

FOREIGN PATENT DOCUMENTS

| CN | 110806610 A | 2/2020 |
| KR | 102074688 B1 | 2/2020 |

OTHER PUBLICATIONS

International Preliminary Report on Patentability for International Application No. PCT/US2022/019035, mailed Sep. 14, 2023, 9 pages.
Gildas Diguet et al., "Physical modeling of the electromechanical behavior of polar heterogeneous polymers" Journal of Applied Physics 112, 114905 (2012).

(Continued)

*Primary Examiner* — Wen Huang
(74) *Attorney, Agent, or Firm* — Greenberg Traurig, LLP

(57) ABSTRACT

A liquid lens includes a substrate, a transparent elastic membrane forming a cavity with the substrate, and a transparent fluid filling the cavity between the substrate and the membrane. The membrane has a pre-distorted, rotationally asymmetric shape in absence of the fluid in the cavity. When the cavity is filled with the fluid and the substrate is disposed vertically w.r.t. gravity at a pre-defined clocking angle, the membrane adopts a substantially rotationally symmetric shape due to elasticity of the membrane counteracting gravity exerting a downward force on the fluid in the cavity, reducing the effect of the gravity sag on optical performance of the liquid lens.

15 Claims, 15 Drawing Sheets

(56) References Cited

OTHER PUBLICATIONS

Weiliang Jia et al., "Progressive Multifocal Liquid Lenses Based on Asymmetric Freeform Surface Structure of Nonuniform Thickness Elastic Membranes with Different Constraints" Hindawi International Journal of Optics vol. 2019, Oct. 27, 2019.

"Electrically tunable large aperture lens EL-16-40-TC (5D)" Datasheet: EL-16-40-TC (5D) Nov. 26, 2019.

International Search Report and Written Opinion for International Application No. PCT/US2022/019035, mailed Jun. 7, 2022, 11 pages.

LIQUID LENS WITH GRAVITY SAG CORRECTION

TECHNICAL FIELD

The present disclosure relates to optical devices, and in particular to liquid lenses and manufacturing methods of liquid lenses.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Visual displays are viewed either directly, or by means of special glasses that may include optical shutters, as well as special varifocal lenses.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed onto surrounding environment. In some near-eye displays, each eye of the user views an image in linear domain displayed on a miniature display panel and observed through a varifocal ocular lens.

Compact and efficient display systems are desired for head-mounted displays. Because a display of HMD or NED is usually worn on the head of a user, a large, bulky, unbalanced, and/or heavy display device would be cumbersome and may be uncomfortable for the user to wear. Compact display devices require compact and efficient light sources, image projectors, lightguides, lens stacks, and so on.

BRIEF DESCRIPTION OF THE DRAWINGS

Exemplary embodiments will now be described in conjunction with the drawings, in which.

DETAILED DESCRIPTION

Figure 1:
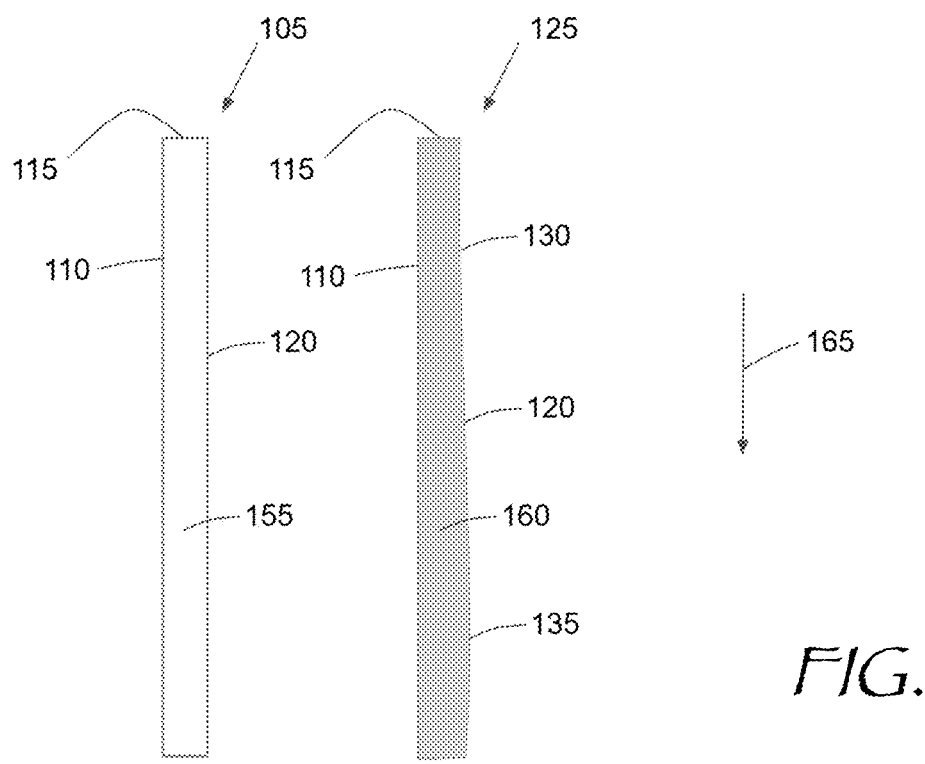
FIG. 1 is a schematic cross-sectional view of unfilled and filled liquid lens without gravity sag correction.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2A-2B, FIG. 17, and FIG. 19, similar reference numerals denote similar elements.

Liquid lenses consist of a transparent substrate, a flexible transparent layer that can change shape, and a fluid between the substrate and the flexible layer. When the liquid lens is vertical, gravity increases fluid pressure at the bottom of the lens, and reduces pressure at the top. This causes the formation of "gravity sag distortion", sometimes referred to as coma. Gravity sag is particularly prominent in large lenses disposed to have an optical axis perpendicular to gravity. Optical distortion in the lens due to the gravity sag is roughly proportional to the height of the lens cubed. The gravity sag may be reduced by increasing the stiffness of the membrane, by applying tension to the membrane, or both. Increasing stiffness increases the energy required to displace the membrane to create a pre-defined optical power, i.e. focusing or defocsing power, of the lens. Stiffness may be increased by increasing the modulus of the membrane, the membrane thickness, or both. Another approach to reduce gravity sag is to create a system of a first substrate, a first fluid, a deformable membrane, a second fluid, and a second substrate, where the first and second fluids have different refractive index. The fluids may have similar densities. Although this approach is effective, it increases the thickness and weight of the lens, reduces transition speed, and reduces the achievable optical power range of the liquid lens.

A liquid lens of this disclosure shows little coma even with a relatively low modulus flexible transparent layer. The lens includes a transparent flexible membrane having a pre-distorted, rotationally asymmetric shape in absence of the fluid in the cavity such that, when the cavity is filled with the fluid and the substrate is disposed vertically w.r.t. gravity at a pre-defined clocking angle, the membrane adopts a substantially rotationally symmetric shape due to elasticity of the membrane counteracting gravity exerting a downward force on the fluid in the cavity. In some embodiments, the membrane may include an electroactive layer configured to adopt a rotationally asymmetric shape in response to application of a controllable electric field to the electroactive layer when the fluid is absent from the cavity.

In accordance with the present disclosure, there is provided a liquid lens comprising a substrate, a transparent elastic membrane forming a cavity with the substrate, and a transparent fluid filling the cavity between the substrate and the membrane. The membrane has a pre-distorted, rotationally asymmetric shape in absence of the fluid in the cavity such that, when the cavity is filled with the fluid and the substrate is disposed vertically w.r.t. gravity at a pre-defined clocking angle, the membrane adopts a substantially rotationally symmetric shape due to elasticity of the membrane counteracting the gravity exerting a downward force on the fluid in the cavity.

In some embodiments, the rotationally asymmetric shape comprises conterminous concave and convex areas of the liquid lens such that, when the liquid lens is placed vertically w.r.t. the gravity at the pre-defined clocking angle in absence of the fluid in the cavity, the convex area of the liquid lens is disposed above the concave area of the liquid lens. A thickness of the membrane may be substantially uniform across a clear aperture of the liquid lens. The substantially rotationally symmetric shape may include a spherical shape. In some embodiments, the liquid lens further includes an electrode for application of electric field to the membrane for varying optical power of the liquid lens by changing a radius of curvature of the membrane. Optical power of the liquid lens may be variable within some pre-determined range, e.g. a range not exceeding −2 Diopters and 2 Diopters.

In embodiments where the membrane comprises a layer of electroactive material, the membrane may further include a backing layer bonded to and supporting the layer of electroactive material. Young's modulus of the backing layer may be greater than Young's modulus of the layer of electroactive material.

In embodiments where the liquid lens includes a spring supporting the membrane around a perimeter of the membrane, the spring may have a stiffness that is spatially variant around the perimeter of the membrane. The membrane may be formed on a surface having the rotationally asymmetric shape.

In accordance with the present disclosure, there is provided a method of manufacturing a liquid lens. The method may include forming a transparent elastic membrane having pre-distorted, rotationally asymmetric shape, mounting the membrane over a substrate to form a cavity between the substrate and the membrane, and filling the cavity with a transparent fluid. The pre-distorted shape of the membrane may be such that, when the cavity is filled with the fluid and the substrate is disposed vertically w.r.t. gravity at a pre-defined clocking angle, the membrane adopts a substantially rotationally symmetric shape due to elasticity of the membrane counteracting the gravity exerting a downward force on the fluid in the cavity. Forming the transparent elastic membrane may include providing a solid surface having the rotationally asymmetric shape, forming the membrane on the surface, the membrane adopting the rotationally asymmetric shape, and removing the membrane from the surface. Forming the membrane on the surface may include providing a layer of adhesive on the surface, and bonding and curing a layer of membrane material on the surface. The membrane material may include e.g. PVDF.

In accordance with the present disclosure, there is further provided a liquid lens comprising a substrate, a transparent elastic membrane forming a cavity with the substrate, and a transparent fluid filling the cavity between the substrate and the transparent membrane. The membrane may include an electroactive layer configured to adopt a rotationally asymmetric shape in response to application of a controllable electric field to the electroactive layer when the fluid is absent from the cavity such that, when the cavity is filled with the fluid and the substrate is disposed vertically w.r.t. gravity at a pre-defined clocking angle, the membrane adopts a substantially rotationally symmetric shape due to the controllable electric field counteracting the gravity exerting a downward force on the fluid in the cavity. The membrane may include a first electrode for application of the controllable electric field to the electroactive layer of the membrane. The membrane may further include a second electrode for application of electric field to the membrane for varying optical power of the liquid lens by changing a radius of curvature of the membrane.

Referring now to FIG. 1, unfilled 105 and filled 125 liquid lenses include a substrate 110, e.g. a transparent, an absorbing, or a reflective substrate, and a transparent elastic membrane 120 forming a cavity 155 with the substrate 110 when sealed by a perimeter edge seal 115. The cavity of the filled liquid lens 125 is filled with a transparent fluid 160. In the filled lens 125, the fluid 160 is pulled downwards by gravity in the direction of arrow 165, which causes the flexible membrane 120 to be pushed outward in a bottom region 135, and accordingly to be pulled inward in a top region 130. The inward pulling and outward pushing creates optical distortions in the filled liquid lens 125.

Figure 2A:
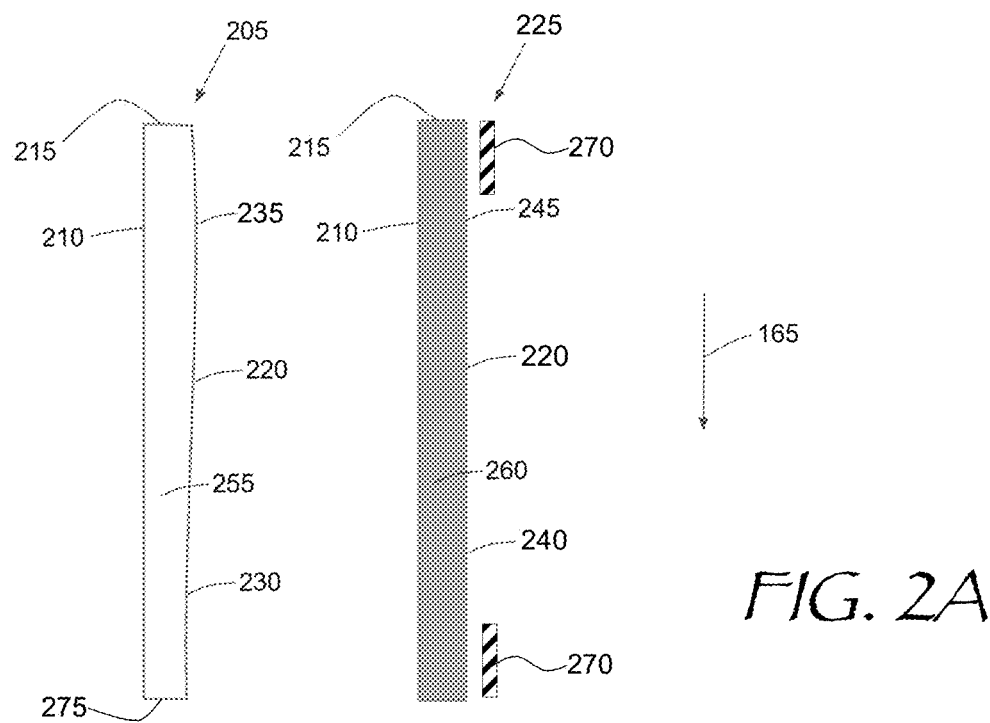
FIG. 2A is a schematic cross-sectional view of unfilled and filled liquid lens with gravity sag correction.

FIG. 2A shows unfilled 205 and filled 225 compensated liquid lenses of this disclosure. Both liquid lenses 205 and 225 include a substrate 210, e.g. a transparent, an absorbing, or a reflective substrate, and a transparent elastic membrane 220 forming a cavity 255 with the substrate 210 when sealed by an edge seal having top 215 and bottom 275 portions. The liquid lens 225 is filled with a transparent fluid 260. The membrane 220 may have a pre-distorted, rotationally asymmetric shape in absence of the fluid in the cavity 255 of the unfilled liquid lens 205. In the embodiment shown, the membrane 220 includes conterminous concave 230 and convex 235 areas. Herein, the term "concave" and "convex" are applied in context of the shape of the liquid lenses 205 and 225. In the unfilled lens 225, the convex area 235 the liquid lens extends outwards and is disposed above the inward-extending concave area 230 of the liquid lens w.r.t. gravity represented by the arrow 165. The membrane 220 may be uniform across a clear aperture of the liquid lenses 205 and 225, i.e. it may be of a substantially constant thickness across the clear aperture of the liquid lenses 105 and 125.

When the cavity 255 is filled with the fluid 260 and the substrate 210 is disposed vertically w.r.t. gravity, that is, along gravity denoted by the arrow 165, the membrane 220 adopts a substantially flat, as shown in the filled liquid lens 225 in FIG. 2A. or rotationally symmetric shape. This occurs due to elasticity of the membrane 220 counteracting gravity exerting a downward force on the fluid 260 in the cavity 255. In other words, the inward pull of the fluid 260 causes the outward push at the bottom of the membrane 220 and an inward pull at the top of the membrane 220, causing respective pre-distorted bottom 240 and top 245 areas to straighten out, becoming one even, substantially symmetrical surface, e.g. a flat surface or a surface of revolution such as a spherical or an aspherical surface. In some embodiments, at least one electrode 270 may be provided for application of electric field to the membrane 220 for varying optical power of the filled liquid lens 225 by changing a radius of curvature of the membrane 220. The membrane 220 may include an electroactive material. In other embodiments, the optical power of the filled liquid lens 225 may be changed by controllably changing the volume of the fluid 160 e.g. by providing a spring 275 supporting the membrane 220 around a perimeter of the membrane 220, and actuating the spring 275 by an actuator, e.g. a voice coil actuator. In some embodiments, e.g. in non-round lenses, a stiffness of the spring 275 is spatially variant, i.e. a function of the position around the lens. There may be a preload between the top and bottom spring. For example, the top portion 215 of the edge seal may be preloaded to push outward, and the bottom portion 275 of the edge seal may be preloaded to pull inward, to overcome prism effects of the lens.

Figure 2B:
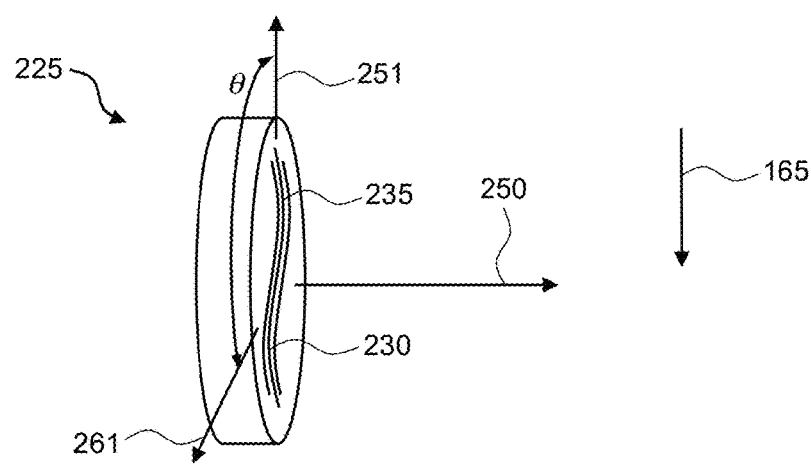
FIG. 2B is a three-dimensional view of the unfilled liquid lens of FIG. 2A.

The pre-distorted shape of the unfilled liquid lens 205 of FIG. 205 is further illustrated in FIG. 2B, where the unfilled liquid lens 205 is re-drawn in a three-dimensional view. The rotationally asymmetric shape of the unfilled liquid lens 205 includes the conterminous concave 230 and convex 235 surface areas. When the unfilled liquid lens 205 (i.e. when the fluid in the cavity is absent) is placed vertically w.r.t. gravity at the pre-defined clocking angle θ, the convex area 235 of the liquid lens 205 is disposed above the concave area 230. Herein, the clocking angle θ is defined as an angle of rotation of a liquid lens about an optical axis 250 of the liquid lens starting from some reference direction or orientation, e.g. from a horizontal orientation 261 as shown. Thus, the clocking angle θ may be defined as the angle between the horizontal orientation 261 and an axis of symmetry 251 of the pre-distorted shape with its conterminous concave 230 and convex 235 surface areas.

Figure 3:
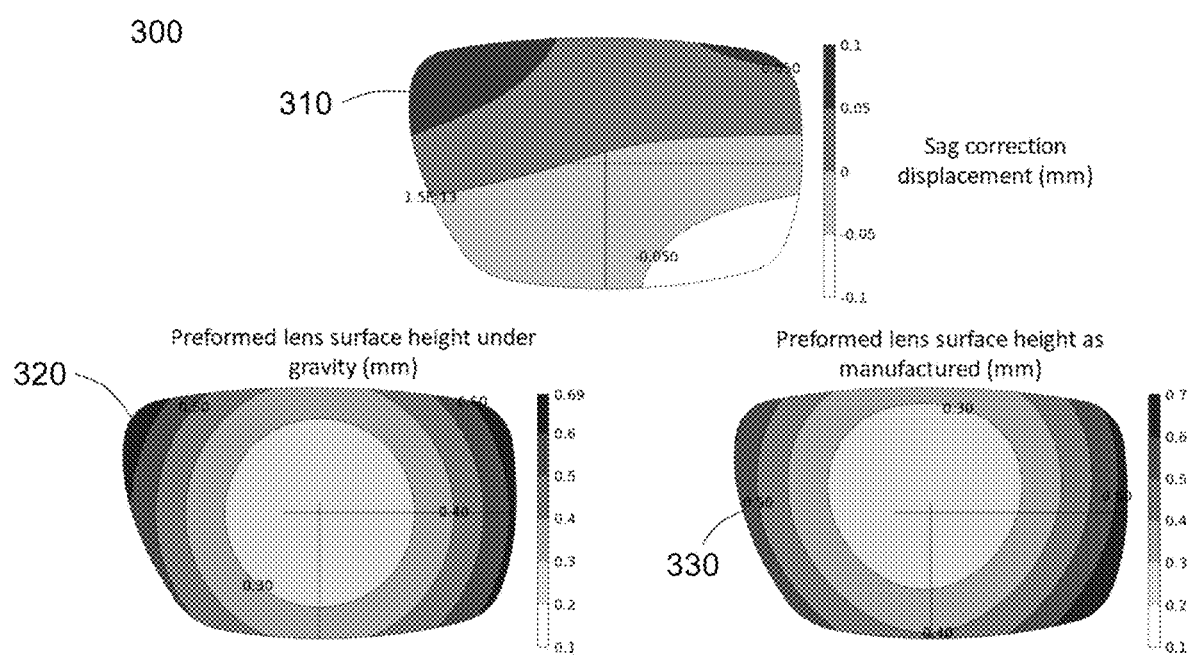
FIG. 3 is a surface sag map of a first pre-distorted liquid lens with gravity sag correction, at different loading scenarios.

Referring to FIG. 3, surface sag maps of an example of the liquid lens 225 of FIGS. 2A and 2B are shown for different loading scenarios. The liquid lens of this example is constructed to have an initial (nominal) optical power of −1.0 Diopters, and consists of a 0.2 mm thick electro-active polymer (EAP) with a $Q_{12}$ electrostrictive coefficient of 5.0 $m^4/C^2$, a dielectric constant of 400, and a Young's modulus of 750 MPa. The EAP layer is bonded to a backing layer of 0.2 mm thickness and 6.4 GPa modulus, i.e. much higher than the Young's modulus of the EAP layer. The liquid lens is supported around the perimeter with a variable stiffness spring of an average stiffness of $1 \times 10^4$ N/m/m. This predormed liquid lens is termed "first pre-distorted liquid lens" throughout the specification. The contours in 330 show the first pre-distorted liquid lens surface height without gravity—as manufactured. The lens surface is not a spherical shape. The contours in 320 show the surface height with gravity. The lens surface in this case is much closer to spherical. The contours in 310 shows the pre-deformation applied to the lens to make it counter the gravity sag. In the contours at 310, the overall sag variation is between −0.1 mm and 0.1 mm, and in the contours at 320 and 330, the overall sag variation is between 0.2 mm and 0.7 mm.

Figure 4:
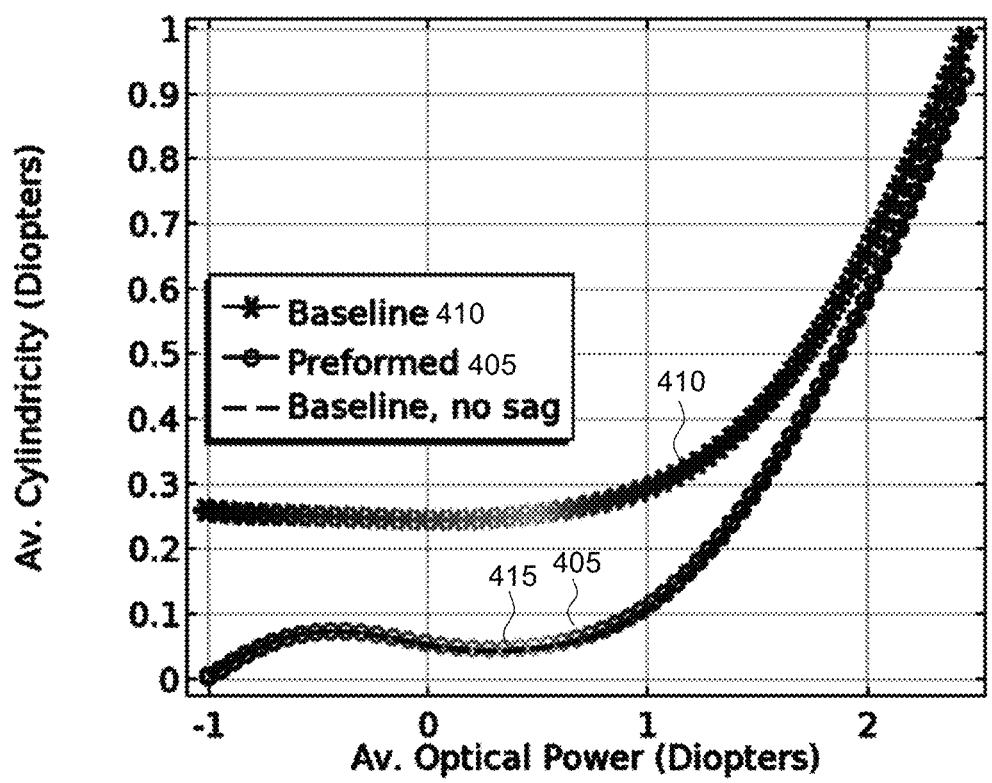
FIG. 4 is a graph of cylindricity vs. average optical power of the first pre-distorted liquid lens of FIG. 3 compared to a corresponding non-distorted liquid lens (i.e. the liquid lens of FIG. 1)

FIG. 4 illustrates a variation of cylindricity with optical power for the first pre-distorted liquid lens (i.e. the lens of FIG. 3) in comparison with the cylindricity variation of a corresponding non-distorted (non-preformed) liquid lens having same membrane parameters, only with a symmetrical membrane when unfilled, such as the liquid lens 105 of FIG. 1. Both liquid lenses are placed vertically, i.e. with their substrates parallel to gravity. Herein and throughout the rest of the specification, the cylindricity is defined as a difference of optical power (i.e. focusing or defocusing power) in two perpendicular planes containing the optical axis of the lens: a horizontal plane and a vertical plane when the lens is placed vertically. The results for the non-preformed liquid lens without gravity are shown for reference and comparison with the results of the preformed liquid lens. The preformed liquid lens curve us shown with circles at 405. For average optical powers of less than 1 Diopter, the cylindricity stays below 0.1 Diopter. The non-preformed liquid lens curve is shown at 410 with "X" shapes. For average optical powers of less than 1 Diopter, the cylindricity stays below 0.3 Diopter, i.e. three times worse than for the preformed liquid lens. The results show that the preformed liquid lens has a lower optical error the full range of actuation Diopters. That is because the main contributor of optical error in this case is the gravity sag, not actuation. The optical response with preform and gravity is virtually identical to the optical response without both illustrated with a dashed line at 415, which runs through the preformed liquid lens data 405. The preform is therefore successful in eliminating the cylindricity error due to gravity at a broad range of actuated optical powers, not just at the nominal (initial) power value of −1 Diopter. It is to be noted that, to achieve the variable optical power, the shape of the membrane is changed by actuating the lens. Despite the shape of the lens changing, the correction applied by the pre-distortion of the membrane remains operational in the range of −1 Diopter to 1 Diopter. In some embodiments, the range may be wider, e.g. from −2 Diopter to 2 Diopter.

Figure 5A:
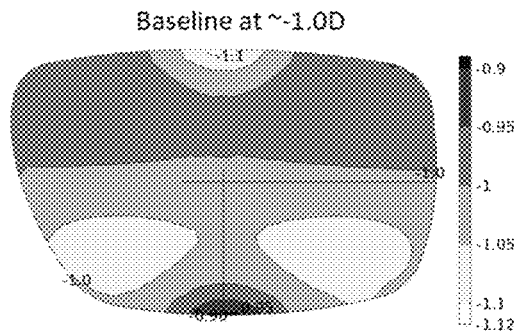
FIGS. 5A and 5B are local optical power maps of the liquid lenses of FIGS. 1 and 3 at an initial setting of −1.0 Diopters.
Figure 5B:
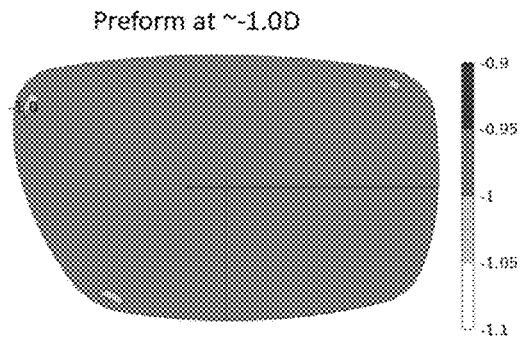
Figure 6A:
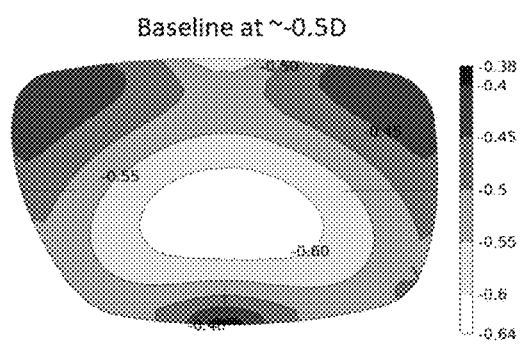
FIGS. 6A and 6B are local optical power maps of the liquid lenses of FIGS. 1 and 3 at a setting of −0.5 Diopters.
Figure 6B:
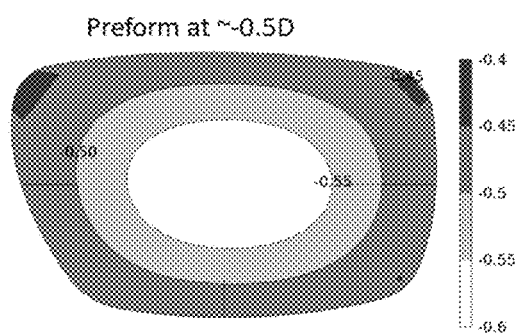
Figure 7A:
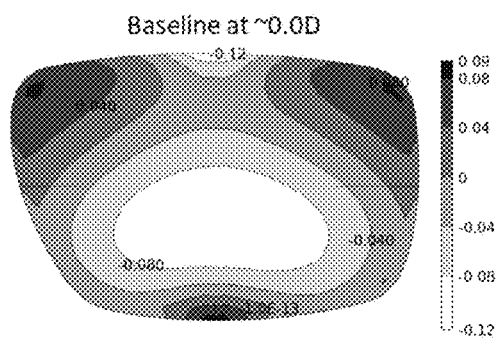
FIGS. 7A and 7B are local optical power maps of the liquid lenses of FIGS. 1 and 3 at a setting of 0.0 Diopters.
Figure 7B:
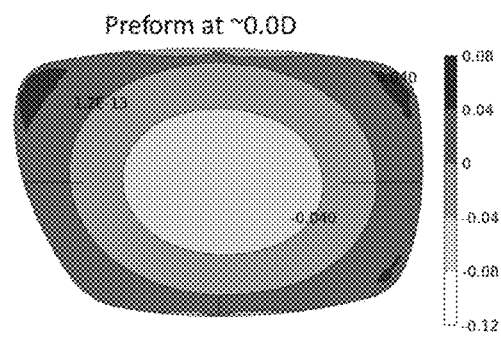
Figure 8A:
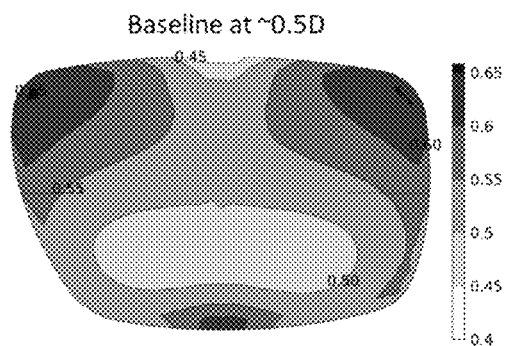
FIGS. 8A and 8B are local optical power maps of the liquid lenses of FIGS. 1 and 3 at a setting of +0.5 Diopters.
Figure 8B:
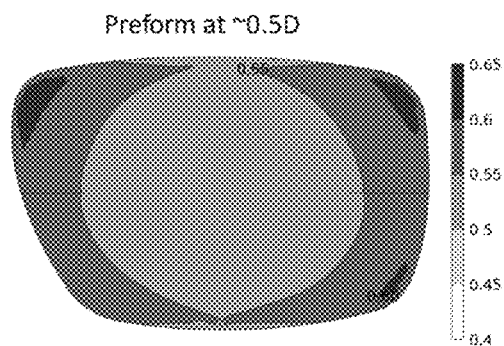

Referring to FIGS. 5A and 5B, optical power uniformity of the first pre-distorted liquid lens (FIG. 5B) is compared to optical power uniformity of corresponding non-distorted, or non-preformed, liquid lens (FIG. 5A). The non-preformed liquid lens, e.g. the lens 105 and 125 of FIG. 1, has the same membrane parameters as the first pre-distorted liquid lens of FIG. 3. The comparison is made at an initial optical power of −1.0 Diopters for both lenses. The local optical power is shown as a greyscale map. Herein and throughput the rest of the specification, the term "local optical power" is taken to mean local focusing or defocusing power experienced by a small-diameter light beam impinging at that particular location of the lens.

One can see that the map of FIG. 5B, corresponding to the preformed lens, is much more uniform than the map of FIG. 5A, corresponding to a non-preformed lens. Notably, the optical power variation in the map of FIG. 5A is over 0.2 Diopters, while the optical power variation in the map of FIG. 5B is much less, about 0.05 Diopters, proving that pre-distortion results in a considerable improvement of the optical power uniformity of the lens across its clear aperture.

Figure 9A:
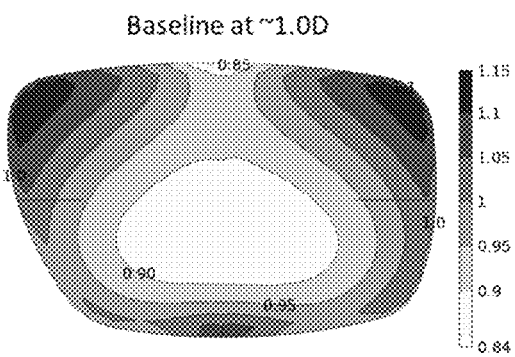
FIGS. 9A and 9B are local optical power maps of the liquid lenses of FIGS. 1 and 3 at a setting of +1.0 Diopters.
Figure 9B:
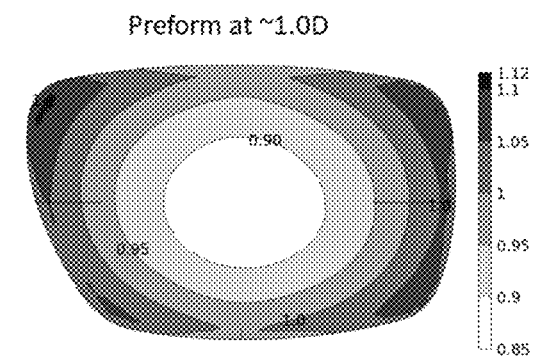

Referring now to FIGS. 6A-6B, 7A-7B, 8A-8B, and 9A-9B, optical power uniformity of the first pre-distorted liquid lens of FIG. 3 ("B" figures) is compared to the optical power uniformity of the corresponding filled non-preformed liquid lens ("A" figures). The comparison is made at different optical power levels of −0.5 Diopter (FIGS. 6A-6B); 0 Diopter (FIGS. 7A-7B); 0.5 Diopter (FIGS. 8A-8B); and 1.0 Diopter (FIGS. 9A-9B). By comparing the "A" and "B" figures, one can see that in the "B" maps, corresponding to the first pre-distorted liquid lens of FIG. 3, the maps are much more symmetrical, and show generally a lesser variation of the optical power across the lens surface, leading to a better optical performance and smaller optical aberrations.

Figure 10:
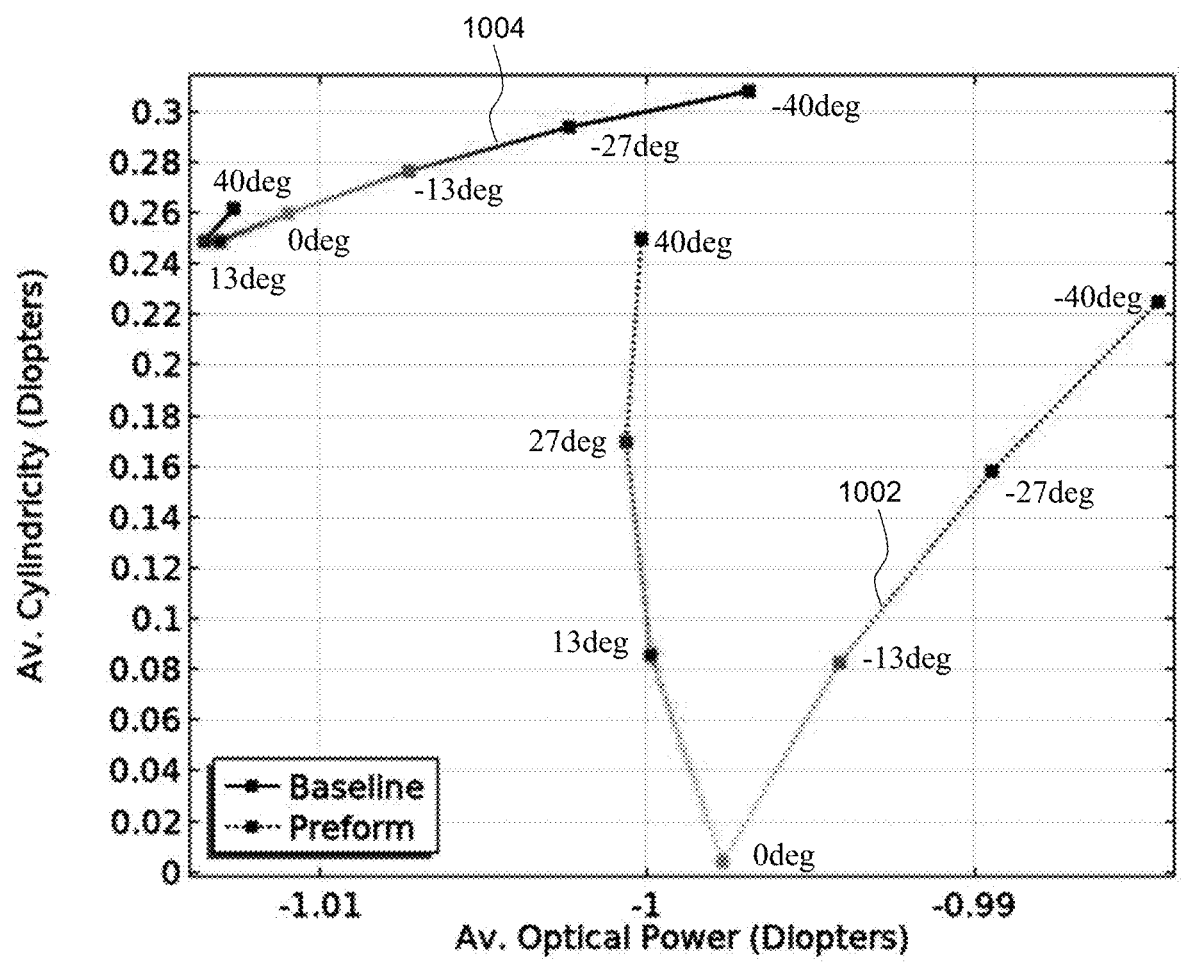
FIG. 10 is a graph of cylindricity vs. average optical power of the liquid lenses of FIGS. 1 and 3 at different tilt (clocking) angles of the lenses.

The gravity sag correction in FIGS. 6A-6B to FIGS. 9A-9B has been optimized for liquid lenses with no tilt, i.e. for lenses with a perfect clocking angle θ of 90 degrees (the clocking angle θ is defined in FIG. 2B). In other words, the liquid lens is not tilted when the user is looking horizontally without tilting of their head to the right or left. In real-life scenarios, however, a user will likely tilt their head to some degree. Accordingly, a verification has been performed to demonstrate that a preformed or pre-compensated liquid lens of this disclosure can also operate at non-zero tilt angles. Referring to FIG. 10, a variation of cylindricity with head tilt angle is shown for the first pre-distorted liquid lens (dashed lines, 1002) and the corresponding lens without preform (solid lines, 1004), when the liquid lenses are not actuated. The lens tilt angles in degrees are shown near each experimental point. The results with preform (1002) and zero tilt are nearly perfect, in a sense that the cylindricity is almost zero. The cylindricity is much higher, around 0.25 Diopter, with no preform (1004) when the head is not tilted. As the head carrying the lenses tilts, the cylindricity error increases with the preform and only as the tilt approaches 45 degrees either way does the ellipticity reach the cylindricity of the non-preformed lens at zero degrees tilt.

Figure 11A:
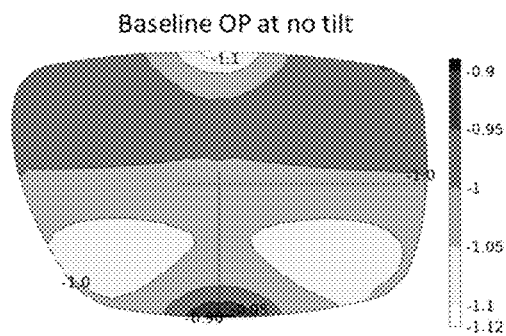
FIGS. 11A and 11B are surface sag maps of the liquid lenses of FIGS. 1 and 3 at the setting of −1.0 Diopters and no tilt.
Figure 11B:
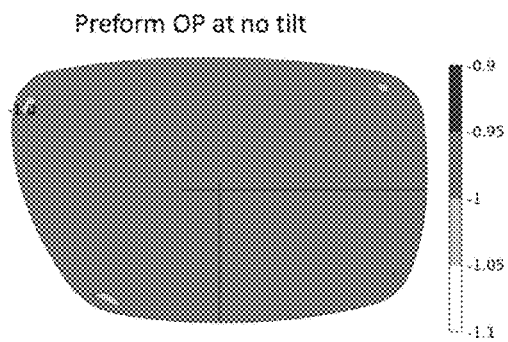

Referring to FIGS. 11A and 11B, optical power uniformity of the first preformed liquid lens (FIG. 11B) is compared to optical power uniformity of the corresponding filled non-preformed liquid lens (FIG. 11A). The comparison is made at an initial optical power of −1.0 Diopters and at zero tilt angle, which is equivalent to the clocking angle θ of 90 degrees. The optical power variation in the map of FIG. 11A (non-preformed liquid lens) is over 0.2 Diopters, while the optical power variation in the map of FIG. 11B (preformed liquid lens) is clearly better—about 0.05 Diopters.

Figure 12A:
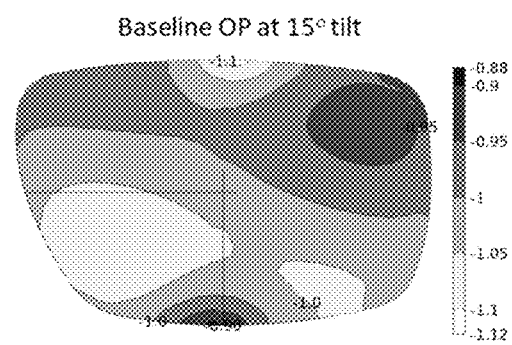
FIGS. 12A and 12B are surface sag maps of the liquid lenses of FIGS. 1 and 3 at the setting of −1.0 Diopters and 15° tilt.
Figure 12B:
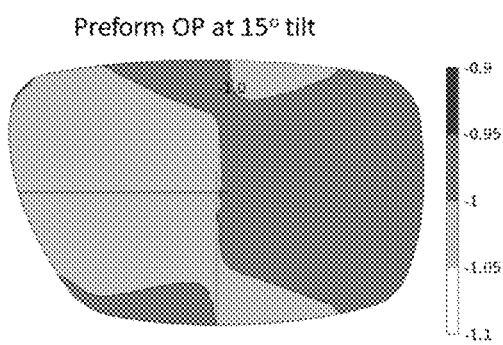
Figure 13A:
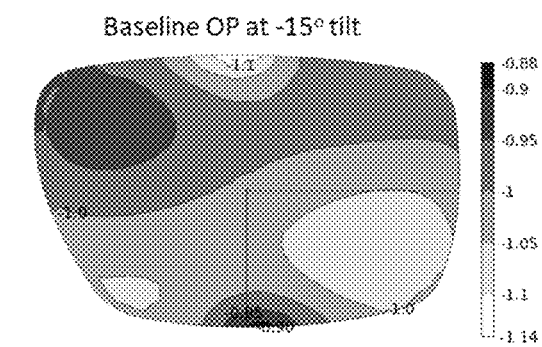
FIGS. 13A and 13B are surface sag maps of the liquid lenses of FIGS. 1 and 3 at the setting of −1.0 Diopters and −15° tilt.
Figure 13B:
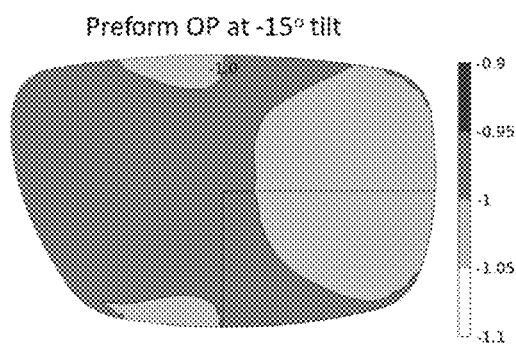
Figure 14A:
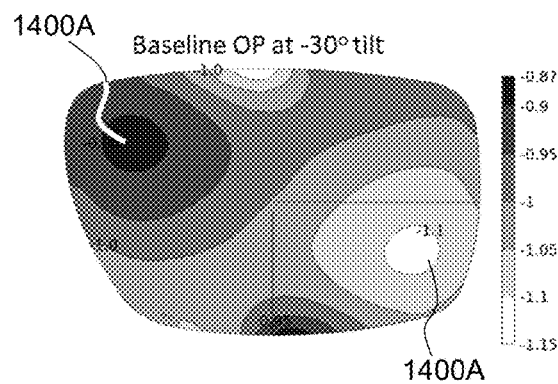
FIGS. 14A and 14B are surface sag maps of the liquid lenses of FIGS. 1 and 3 at the setting of −1.0 Diopters and −30° tilt.
Figure 14B:
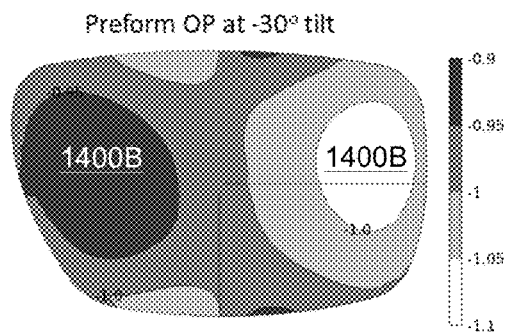

Referring now to FIGS. 12A-12B, 13A-13B, and 14A-14B, optical power uniformity of the first pre-distorted liquid lens ("B" figures) is compared to the baseline of optical power uniformity of the corresponding filled non-preformed liquid lens ("A" figures). The comparison is made at different tilt angles of 15 degrees (FIGS. 12A-12B); −15 degrees (FIGS. 13A-13B); and −30 degrees (FIGS. 13A-13B). The results at 15 degrees tilt (FIGS. 12A-12B) and −15 degrees tilt (FIGS. 13A-13B) show a common trend: the optical power is more non-uniform for the non-preformed liquid lens (FIGS. 12A and 13A) than for the first preformed liquid lens (FIGS. 12B and 13B). For the non-preformed liquid lens, the non-uniformity amplitude is about 0.2 Diopter, whereas for the first preformed liquid lens, the non-uniformity amplitude is about 0.05 Diopter. Preformed (pre-distorted) liquid lens data also show smaller gradients and a more symmetrical pattern. This trend was mostly carried through to the case of −30 degrees tilt (FIGS. 14A and 14B). For the non-preformed liquid lens case (FIG. 14A), the non-uniformity amplitude is about 0.3 Diopter. For the preformed liquid lens case (FIG. 14B), the non-uniformity amplitude is less, about 0.2 Diopter, and the optical power gradients are smaller, as is evidenced by wider black and white peaks 1400B of FIG. 14B as compared to sharp black and white peaks 1400A of FIG. 14A.

Figure 15:
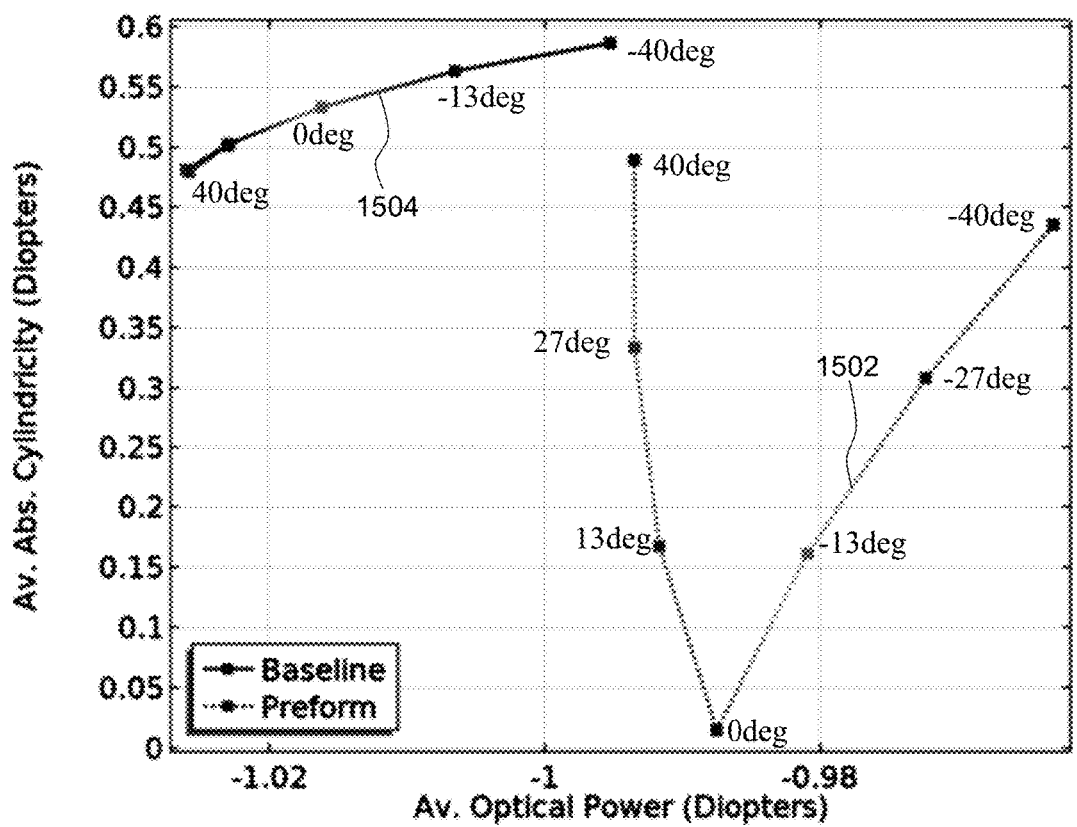
FIG. 15 is a graph of cylindricity vs. average optical power of a second, softer pre-distorted liquid lens, as well as cylindricity vs. average optical power graph of a corresponding non-distorted liquid lens at different tilt (clocking) angles of the lenses.

Turning to FIG. 15, a variation of cylindricity with head tilt angle is shown for a second pre-distorted liquid lens. The second pre-distorted liquid lens is softer than the first pre-distorted lens of FIGS. 3 to 14A-B. The membrane of the second pre-distorted liquid lens includes a 0.2 mm thick EAP layer with a $Q_{12}$ coefficient of 1.394 m$^4$/C$^2$, a dielectric constant of 800, and a softer Young's modulus of 40 MPa. This layer is bonded to a backing layer of 0.18 mm thickness and 8.0 GPa modulus. The lens is supported around the perimeter with a variable stiffness spring of an average stiffness of 1×10$^4$ N/m/m. The results with preform (1502) and zero tilt are nearly perfect, in a sense that the cylindricity is almost zero. The cylindricity is much higher, around 0.55 Diopter, with no preform (1504) when the head is not tilted. As the head carrying the lenses tilts, the cylindricity error increases with the preform and only as the tilt approaches 45 degrees either way does the ellipticity reaches the cylindricity of the non-preformed lens at zero degrees tilt. The result pf FIG. 15 is similar to that of FIG. 10 showing cylindricity variation vs. tilt for the first, stiffer pre-distorted liquid lens, only the value of the cylindricity of the non-tilted, non-distorted lens baseline in FIG. 15 is about twice higher, 0.5 Diopters instead of 0.25 Diopters. This result indicates that pre-distortion may open up the design space of the liquid lens in terms of the membrane stiffness, enabling softer membranes to be used.

Figure 16:
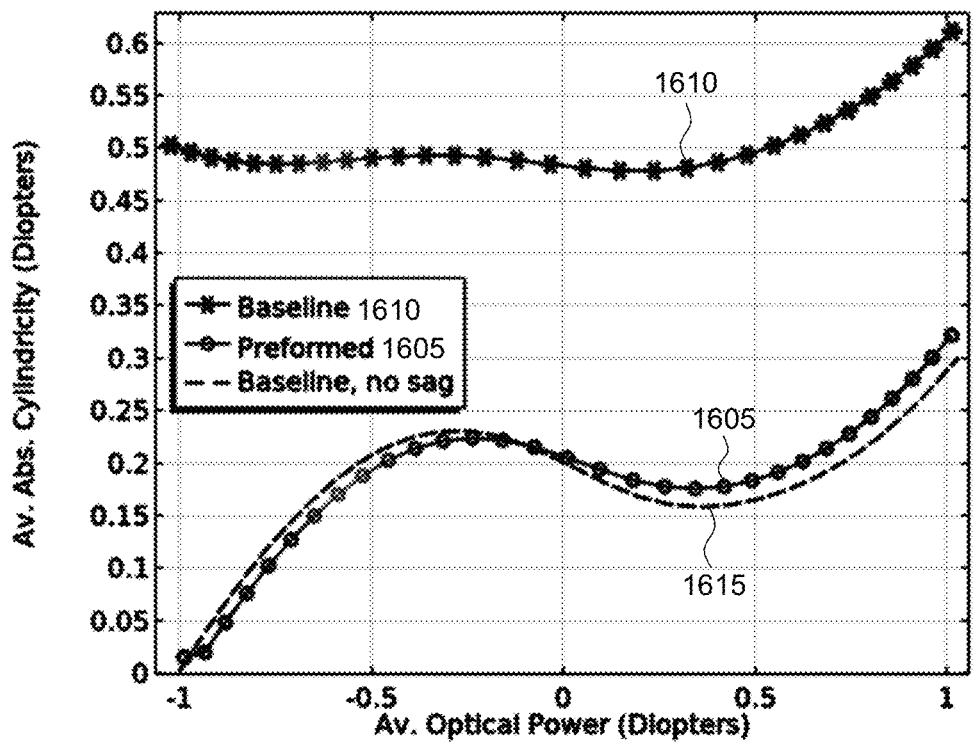
FIG. 16 is a graph of cylindricity vs. average optical power of the second pre-distorted liquid lens.

Referring now to FIG. 16, a variation of cylindricity with optical power for the second pre-distorted (preformed) liquid lens is compared with the cylindricity variation of a corresponding non-distorted (non-preformed) liquid lens having same membrane parameters, only with a symmetrical membrane when unfilled, such as the liquid lens 105 of FIG. 1. Both liquid lenses are placed vertically, i.e. with the planes of their substrates parallel to gravity. The results for the non-preformed liquid lens without gravity are shown for reference and comparison with the results of the preformed liquid lens. The preformed liquid lens curve us shown with circles at 1605. For average optical powers of less than 1 Diopter, the cylindricity stays below approximately 0.3 Diopter. The non-preformed liquid lens curve is shown with "X" shapes at 1610. For average optical powers of less than 1 Diopter, the cylindricity stays between 0.45 Diopter and 0.6 Diopter, i.e. about two times worse than for the preformed liquid lens. The results show that the preformed liquid lens has a lower optical error the full range of actuation from −1 to 1 Diopters. The optical response with preform and gravity is very similar to the optical response without both illustrated with a dashed line at 1615, which runs very close to the preformed liquid lens data 1605. The cylindricity of the second pre-distorted liquid lens is larger than the cylindricity of the first pre-distorted liquid lens considered above with reference to FIG. 4, due to the membrane of the second liquid lens being softer than the membrane of the first lens.

Figure 17A:
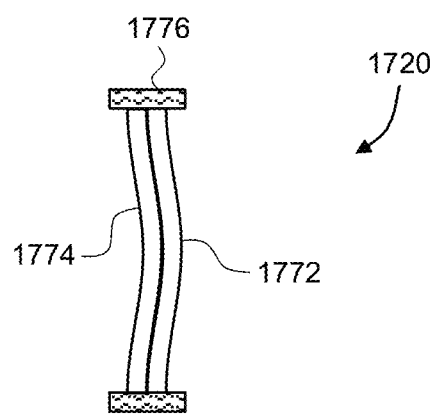
FIG. 17A is a side cross-sectional view of an embodiment of a membrane of a liquid lens of this disclosure.

Turning to FIG. 17A, a transparent membrane 1720 of a liquid lens of this disclosure may include a layer of electroactive material 1772 such as, for example, a polyvinylidene fluoride (PVDF), which may be supported by a backing layer 1774 bonded to the layer of electroactive material 1772. Suitable backing layer material include polymer, such as polymethylmethacrylate, polycarbonate, or cyclic polyolefin, glass, ceramics such as sapphire, and combinations thereof. Young's modulus of the backing layer 1774 may be greater than Young's modulus of the layer of electroactive material 1772, to provide a greater elastic force of the membrane 1720. A spring 1776 may support the membrane 1720 around a perimeter of the membrane 1720. The spring 1776 may have a spatially variant stiffness around the perimeter of the transparent membrane 1720. The spring 1776 may also have a preload, exerting force outward increasing separation between the substrate and the membrane 1720 on the top, and pulling inward at the bottom. The predetermined stiffness and preload may be incorporated into the seal e.g. by varying the modulus of the spring material, the shape of the seal, or a combination of the two.

Figure 17B:
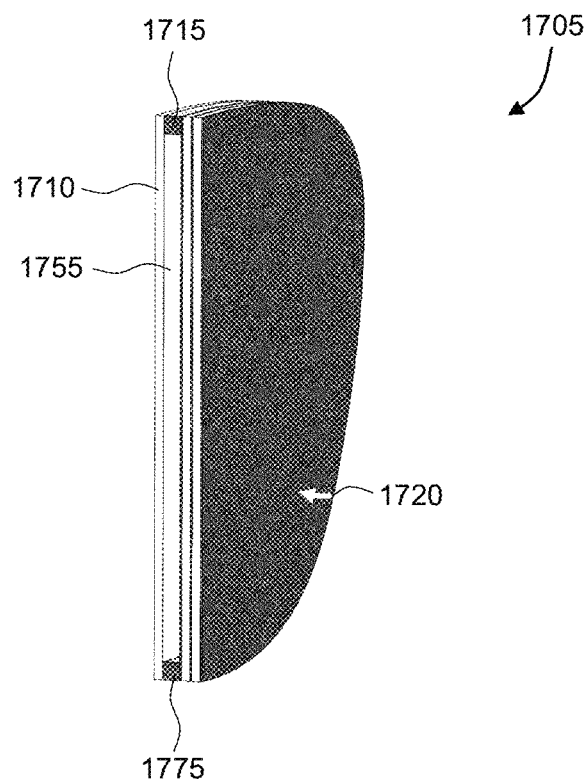
FIG. 17B is a cross-sectional three-dimensional view of an unfilled liquid lens variant of the liquid lens of FIGS. 2A and 2B, the liquid lens having a three-electrode membrane.
Figure 17C:
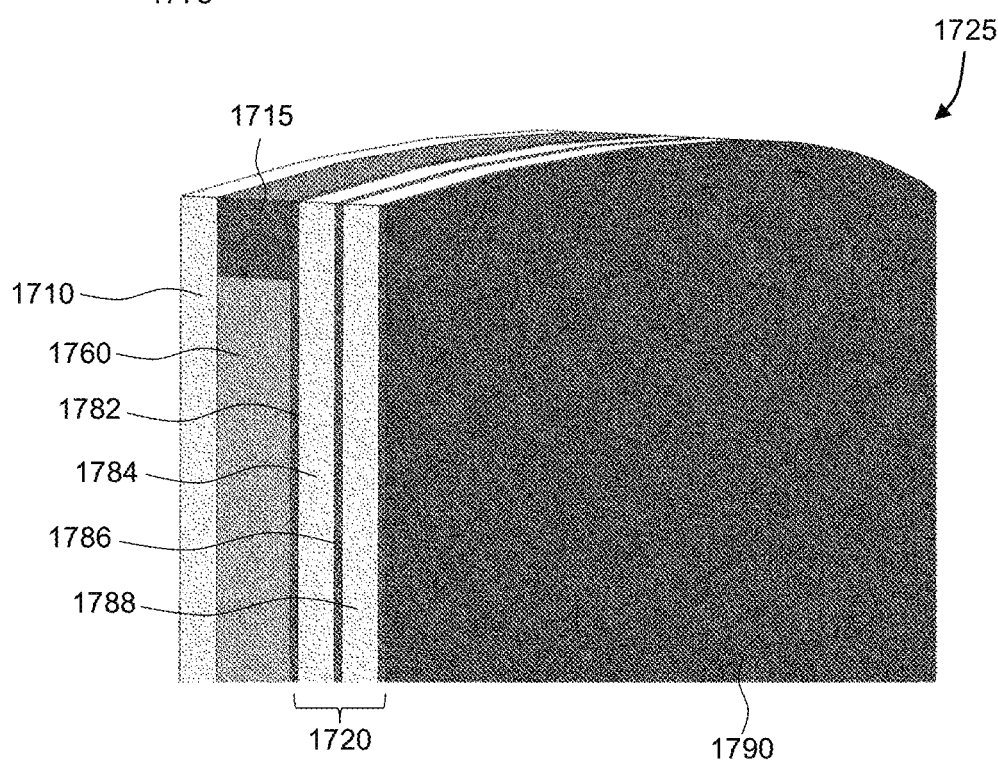
FIG. 17C is a magnified cross-sectional three-dimensional view of the lens of FIG. 17B filled with a transparent fluid.

Referring to FIGS. 17B and 17C, an unfilled compensated liquid lens 1705 (FIG. 17B) is a variant of the unfilled compensated liquid lens 205 of FIG. 2A, and a filled compensated liquid lens 1725 (FIG. 17C) is a variant of the unfilled compensated liquid lens 225 of FIG. 2A. The unfilled compensated liquid lens 1705 (FIG. 17B) includes a substrate 1710 and a transparent elastic membrane 1720 forming a cavity 1755 with the substrate 1710 when sealed by an edge seal having top 1715 and bottom 1775 portions. The filled liquid lens 1725 (FIG. 17C) is filled with a transparent fluid 1760. The membrane 1720 may have a pre-distorted, rotationally asymmetric shape in absence of the fluid in the cavity 7155 of the unfilled liquid lens 7105. In the embodiment shown in FIG. 17C, the membrane 1720 includes a stack of the following transparent layers: a first electrode 1782, a first material 1784, a second electrode 1786, a second material 1788, and a third electrode 1790. When an electric field is applied to the first 1784 and second 1788 materials by means of the first 1782, second 1786, and third 1790 electrodes, the membrane deforms, causing the optical power of the filled liquid lens 1725 to vary.

The first material 1784 may be e.g. a piezoelectric material or an electrostrictive polymer. The first 1782 and second 1786 electrodes and, for bimorph piezoelectric materials, the third electrode 1790 may be, without limitation, a transparent conductive oxide such as indium tin oxide (ITO) or indium gallium zinc oxide (IGZO), or a nanowire electrode, graphene or carbon nanotube electrodes, metal electrodes, including aluminum or silver, or multilayer optical stacks of, for example, ITO and silver thin films. The electrostrictive material may be acrylate elastomer, silicone, PVDF-TrFE-CTF, and the like. Piezoelectric materials may be PVDF, PVDF-TrFE polymers, or ceramics such as PMN-PT, PZT, LiNbO3 and the like. For unimorph membranes, either of the first 1784 or second 1788 materials may be a passive material such as polymer, glass, or ceramic, or a combination thereof. The stiffness of the edge seal may be spatially variant as described above.

Figure 18A:
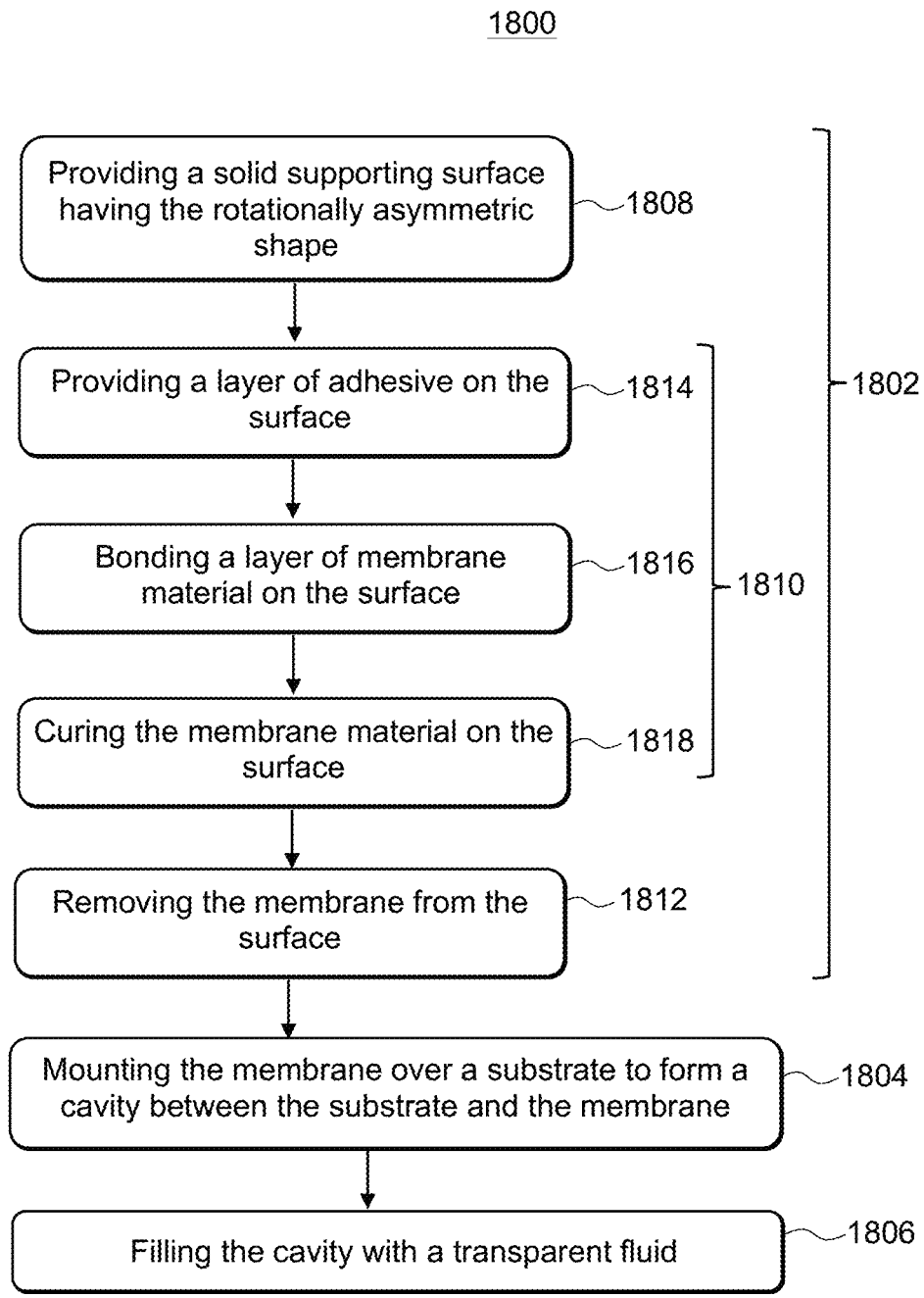
FIG. 18A is a flow chart of a method of manufacturing a liquid lens of this disclosure.

Referring to FIG. 18A, a method 1800 of manufacturing a liquid lens of this disclosure includes forming (1802) a transparent elastic membrane having a pre-distorted, rotationally asymmetric shape. The rotationally asymmetric shape is such that, when the cavity of the liquid lens is filled with a transparent fluid and the substrate of the liquid lens is disposed vertically w.r.t. gravity at a pre-defined clocking angle, the membrane adopts a substantially rotationally symmetric shape due to elasticity of the membrane counteracting gravity exerting a downward force on the fluid in the cavity of the liquid lens. The formed membrane may be mounted (1804) over the substrate of the liquid lens, forming the cavity between the substrate and the membrane. The cavity may be filled (1806) with transparent fluid.

The forming step 1802 may include providing (1808) a solid surface having the rotationally asymmetric shape. The rotationally asymmetric shape may be computed or empirically determined, and the surface on which the membrane is formed may be manufactured e.g. by diamond turning. The membrane is then formed (1810) on the surface, the membrane adopting the rotationally asymmetric shape of the supporting surface. The membrane may then be removed (1812) from the supporting surface. The membrane forming step 1810 may, in its turn, include providing (1814) a layer of adhesive on the surface, followed by bonding (1816) and curing (1818) a layer of membrane material on the surface.

Figure 18B:
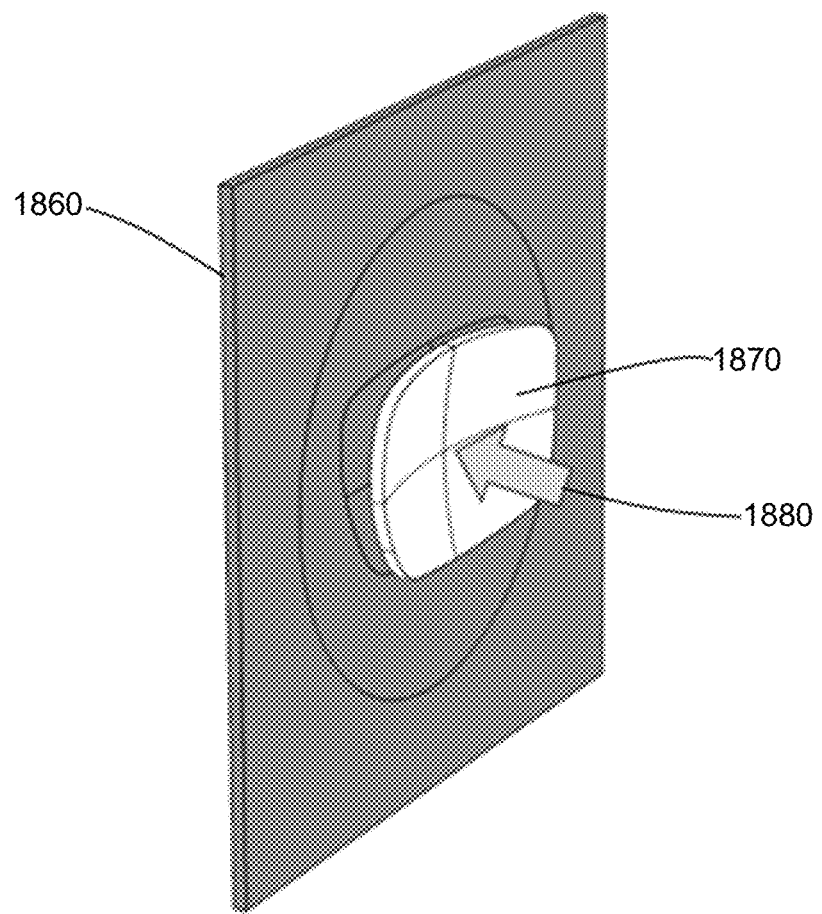
FIG. 18B is a three-dimensional view of a membrane of the liquid lens being formed by pressing a layer of electroactive material against a curved preformed substrate.

Referring now to FIG. 18B, the membrane of the liquid lens may be formed by bonding an electroactive material 1860 to a substrate or preform 1870. The electroactive material 1860 conforms to the shape of the preform 1870. The surface of the preform 1870 that contacts the electroactive material 1860 may be flat, have a simple curve such as a cylindrical shape, or a compound curve such as a spherical or aspherical shape, or a combination thereof. The surface may be more complex shapes, including Zernike shapes. The surface may be convex or concave or may have regions with some being concave and other regions being convex. Pressure 1880 may be applied to both the electroactive material 1860 and the preform 1870. Pressure may be applied mechanically, such as through a frame holding the electroactive material 1860, or through fluid pressure such as pressurized air or vacuum, for example. The electroactive material 1860 and the surface of the preform 1870 may have coatings applied to one or more surfaces. Suitable coatings include electrodes or adhesives, or both. Suitable adhesives include radiation curable materials, for example, acrylic monomers and thermally cured adhesives such as epoxies, urethanes, and thermally initiated acrylates. Other methods of bonding may be used as well, such as wafer bonding technology. The adhesive(s) may include a solvent that may be removed by diffusion after bonding.

Figure 19:
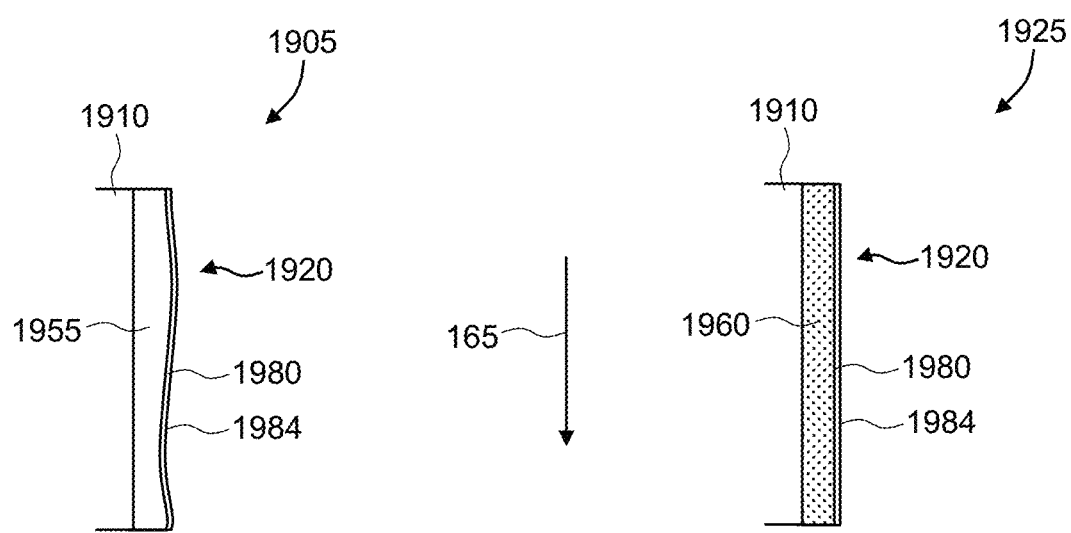
FIG. 19 is a side cross-sectional view of an embodiment of a liquid lens with a membrane adopting an asymmetric shape upon application of electric field.

In some embodiments of this disclosure, the membrane of a liquid lens may be made to adapt a required pre-distorted, non-rotationally symmetric shape by applying an asymmetric force to the membrane, e.g. by applying a properly configured electric field to the membrane, causing the membrane to deform to a desired shape. Turning to FIG. 19 for example, an unfilled 1905 and filled 1925 compensated liquid lenses of this disclosure include a substrate 1910, e.g. a transparent or a reflective substrate, and a transparent elastic membrane 1920 forming a cavity 1955 with the substrate 1910. The membrane 1920 may include an electroactive layer 1922. The filled liquid lens 1925 is filled with a transparent fluid 1960.

The membrane 1920 may be provided with a shaped and/or segmented electrode 1980 for application of a controllable electric field to the electroactive layer 1922 of the membrane 1920. Herein, the term "shaped" means having a shape or footprint different from the shape or footprint of the membrane 1920, e.g. occupying an asymmetric portion of the area of the membrane 1920. The shaped and/or segmented electrode 1980 may be e.g. one of the first 1782, second 1786, and/or third 1790 electrodes of the liquid lens 1725 of FIG. 17C. The electroactive layer 1922 may be configured to adopt a rotationally asymmetric shape, similar to the shape of the unfilled liquid lens 205 of FIG. 2, in response to application of the controllable electric field by the aped and/or segmented electrode 1980 to the electroactive layer when the fluid 1960 is absent from the cavity. The aped and/or segmented electrode 1980 may be configured for producing the required electric field.

When the cavity 1955 is filled with the fluid 1960, and the substrate 1910 is disposed vertically at a pre-defined clocking angle w.r.t. gravity indicated by the arrow 165, the membrane adopts a substantially rotationally symmetric shape due to the controllable electric field produced by the shaped and/or segmented electrode 1980 counteracting gravity exerting a downward force on the fluid 1960 in the cavity 1955. The electrode structure of the liquid lens 1925 may further include a focusing electrode 1984 for application of electric field to the membrane for varying optical power of the liquid lens 1925 by changing a radius of curvature of the membrane 1920. The focusing electrode 1984 may be e.g. another one of the first 1782, second 1786, and/or third 1790 electrodes of the liquid lens 1725 (FIG. 17C). The electric signal applied to the shaped and/or segmented electrode 1980 (FIG. 19) may be varied in dependence upon the voltage applied to the focusing electrode 1984 to correct the lens shape at different optical power levels and further lessen optical aberrations due to gravity sag at different optical power levels.

Figure 20:
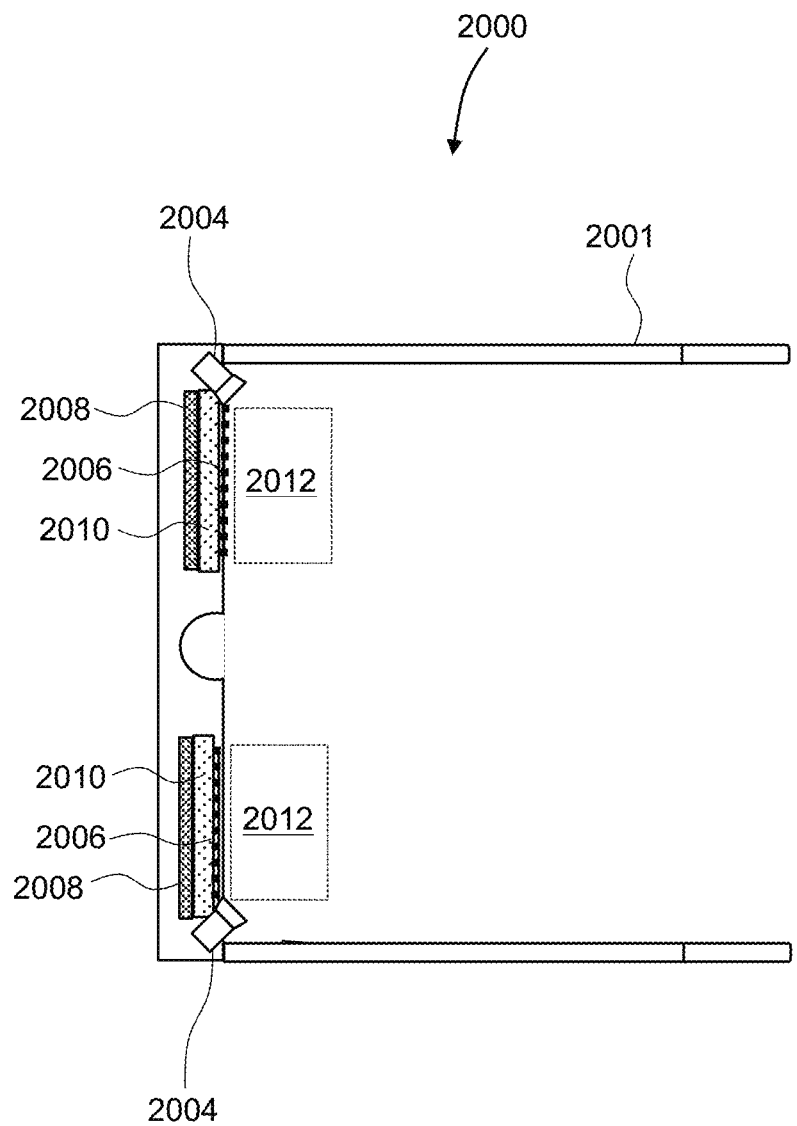
FIG. 20 is a top view of a near-eye display of this disclosure having a form factor of a pair of eyeglasses.

Referring to FIG. 20, an augmented reality (AR) near-eye display 2000 includes a frame 2001 having a form factor of a pair of eyeglasses. The frame 2001 supports, for each eye: an electronic display panel 2008, an ocular lens system 2010 optically coupled to the electronic display panel 2008, and an eye-tracking camera 2004, and a plurality of illuminators 2006. The ocular lens system 2010 may include any of the liquid lenses disclosed herein. The illuminators 2006 may be supported by the ocular lens system 2010 for illuminating an eyebox 2012. The electronic display panel 2008 provides an image in linear domain that is converted by the ocular lens system 2010 into an image in angular domain for observation by a user's eye.

The purpose of the eye-tracking cameras 2004 is to determine position and/or orientation of both eyes of the user. Once the position and orientation of the user's eyes are known, a gaze convergence distance and direction may be determined. The imagery displayed by the display panels 2008 may be adjusted dynamically to account for the user's gaze, for a better fidelity of immersion of the user into the displayed augmented reality scenery, and/or to provide specific functions of interaction with the augmented reality. The focal length of the ocular lens systems 2010 may also be adjusted by tuning corresponding liquid lenses of the ocular lens systems 2010, to lessen vergence-accommodation conflict that may cause tiredness and headache in some users. In operation, the illuminators 2006 illuminate the eyes at the corresponding eyeboxes 2012, to enable the eye-tracking cameras 2004 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 2012.

Figure 21:
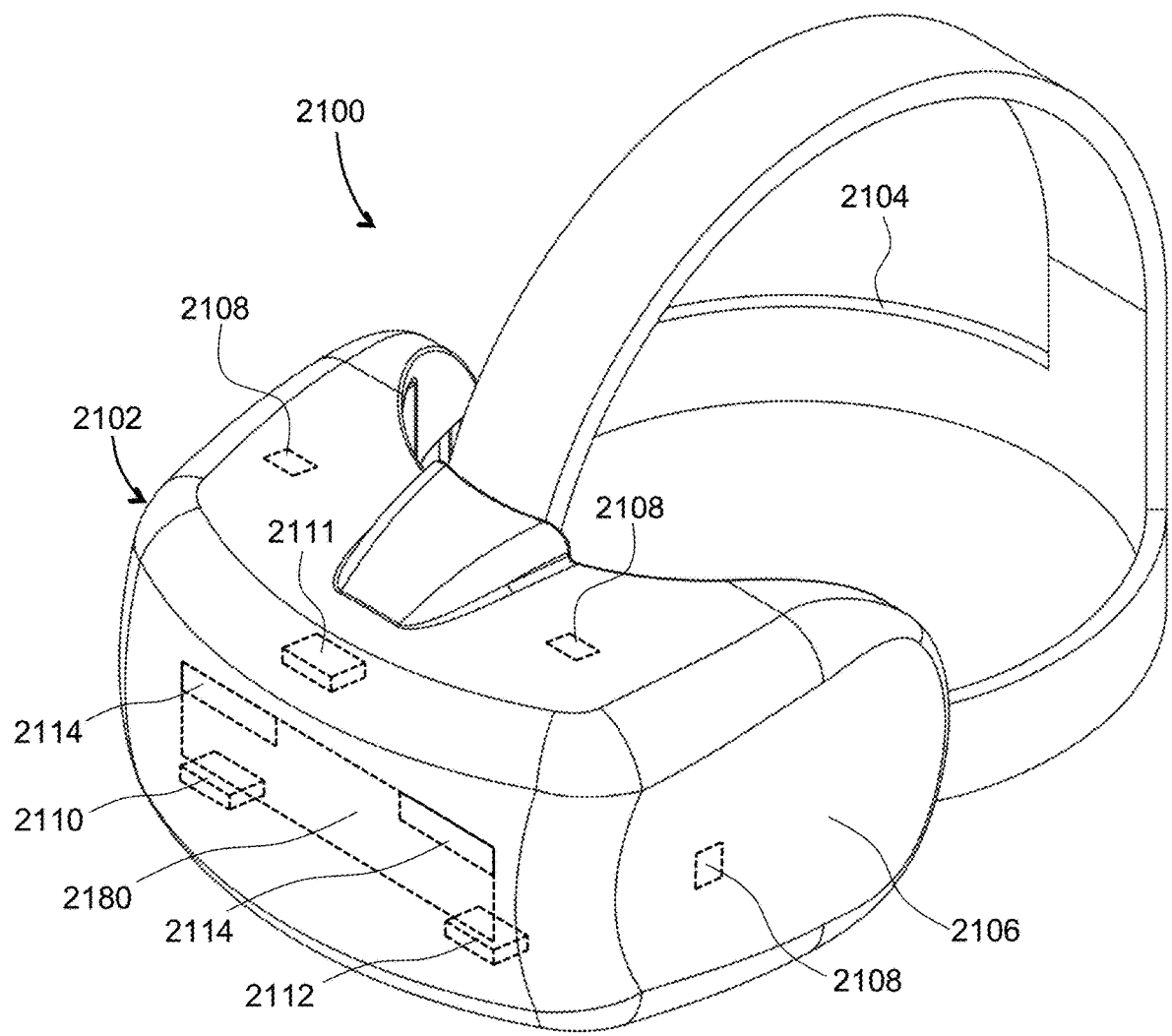
FIG. 21 is a three-dimensional view of a head-mounted display of this disclosure.

Turning to FIG. 21, an HMD 2100 is an example of an AR/VR wearable display system which encloses the user's face, for a greater degree of immersion into the AR/VR environment. The function of the HMD 2100 may be to generate the entirely virtual 3D imagery. The HMD 2100 may include a front body 2102 and a band 2104. The front body 2102 is configured for placement in front of eyes of a user in a reliable and comfortable manner, and the band 2104 may be stretched to secure the front body 2102 on the user's head. A display system 2180 may be disposed in the front body 2102 for presenting AR/VR imagery to the user. The display system 2180 may include any of the liquid lenses disclosed herein. Sides 2106 of the front body 2102 may be opaque or transparent.

In some embodiments, the front body 2102 includes locators 2108 and an inertial measurement unit (IMU) 2110 for tracking acceleration of the HMD 2100, and position sensors 2112 for tracking position of the HMD 2100. The IMU 2110 is an electronic device that generates data indicating a position of the HMD 2100 based on measurement signals received from one or more of position sensors 2112, which generate one or more measurement signals in response to motion of the HMD 2100. Examples of position sensors 2112 include: one or more accelerometers, one or more gyroscopes, one or more magnetometers, another suitable type of sensor that detects motion, a type of sensor used for error correction of the IMU 2110, or some combination thereof. The position sensors 2112 may be located external to the IMU 2110, internal to the IMU 2110, or some combination thereof.

The locators 2108 are traced by an external imaging device of a virtual reality system, such that the virtual reality system can track the location and orientation of the entire HMD 2100. Information generated by the IMU 2110 and the position sensors 2112 may be compared with the position and orientation obtained by tracking the locators 2108, for improved tracking accuracy of position and orientation of the HMD 2100. Accurate position and orientation is important for presenting appropriate virtual scenery to the user as the latter moves and turns in 3D space.

The HMD 2100 may further include a depth camera assembly (DCA) 2111, which captures data describing depth information of a local area surrounding some or all of the HMD 2100. The depth information may be compared with the information from the IMU 2110, for better accuracy of determination of position and orientation of the HMD 2100 in 3D space.

The HMD 2100 may further include an eye tracking system 2114 for determining orientation and position of user's eyes in real time. The obtained position and orientation of the eyes also allows the HMD 2100 to determine the gaze direction of the user and to adjust the image generated by the display system 2180 accordingly. In one embodiment, the vergence, that is, the convergence angle of the user's eyes gaze, is determined. The determined gaze direction and vergence angle may be used to adjust focal length of liquid lenses of the display system 2180 to reduce the vergence-accommodation conflict. The direction and vergence may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2102.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A liquid lens comprising:
a substrate;
a transparent elastic membrane forming a cavity with the substrate; and
a transparent fluid filling the cavity between the substrate and the membrane;
wherein the membrane has a pre-distorted, rotationally asymmetric shape in absence of the fluid in the cavity such that, when the cavity is filled with the fluid and the substrate is disposed vertically with respect to gravity at a pre-defined clocking angle, the membrane adopts a substantially rotationally symmetric shape due to elasticity of the membrane counteracting the gravity exerting a downward force on the fluid in the cavity, wherein the membrane is formed on a surface having the rotationally asymmetric shape.

2. The liquid lens of claim 1, wherein the rotationally asymmetric shape comprises conterminous concave and convex areas of the liquid lens such that, when the liquid lens is placed vertically with respect to the gravity at the pre-defined clocking angle in absence of the fluid in the cavity, the convex area of the liquid lens is disposed above the concave area of the liquid lens.

3. The liquid lens of claim 1, wherein a thickness of the membrane is substantially uniform across a clear aperture of the liquid lens.

4. The liquid lens of claim 1, wherein the substantially rotationally symmetric shape comprises a spherical shape.

5. The liquid lens of claim 1, further comprising an electrode for application of electric field to the membrane for varying optical power of the liquid lens by changing a radius of curvature of the membrane.

6. The liquid lens of claim 1, wherein optical power of the liquid lens is variable within a range not exceeding −2 Diopters and 2 Diopters.

7. The liquid lens of claim 1, wherein the membrane comprises a layer of electroactive material.

8. The liquid lens of claim 7, wherein the membrane further comprises at least one transparent electrode.

9. The liquid lens of claim 7, wherein the membrane further comprises a backing layer bonded to and supporting the layer of electroactive material.

10. The liquid lens of claim 9, wherein Young's modulus of the backing layer is greater than Young's modulus of the layer of electroactive material.

11. The liquid lens of claim 1, further comprising a spring supporting the membrane around a perimeter thereof.

12. The liquid lens of claim 11, wherein the spring has a stiffness that is spatially variant around the perimeter of the membrane.

13. A method of manufacturing a liquid lens, the method comprising:
forming a transparent elastic membrane having pre-distorted, rotationally asymmetric shape, wherein forming the transparent elastic membrane comprises:
providing a solid surface having the rotationally asymmetric shape;
forming the membrane on the surface, the membrane adopting the rotationally asymmetric shape; and
removing the membrane from the surface;
mounting the membrane over a substrate to form a cavity between the substrate and the membrane; and
filling the cavity with a transparent fluid;
wherein the pre-distorted shape of the membrane is such that, when the cavity is filled with the fluid and the substrate is disposed vertically with respect to gravity at a pre-defined clocking angle, the membrane adopts a substantially rotationally symmetric shape due to elasticity of the membrane counteracting the gravity exerting a downward force on the fluid in the cavity.

14. The method of claim 13, wherein forming the membrane on the surface comprises:
providing a layer of adhesive on the surface; and
bonding and curing a layer of membrane material on the surface.

15. The method of claim 14, wherein the membrane material comprises PVDF.

* * * * *